United States Patent [19]

Oku et al.

[11] Patent Number: 4,779,143
[45] Date of Patent: Oct. 18, 1988

[54] VIDEO DISC RECORDING AND/OR REPRODUCING APPARATUS FOR COLOR VIDEO SIGNAL

[75] Inventors: Masao Oku, Kamakura; Isao Saito, Yokohama, both of Japan

[73] Assignee: Hitachi, Ltd., Tokyo, Japan

[21] Appl. No.: 930,564

[22] Filed: Nov. 14, 1986

[30] Foreign Application Priority Data

Nov. 15, 1985 [JP] Japan .................................. 60-254728
Nov. 27, 1985 [JP] Japan .................................. 60-264875

[51] Int. Cl.$^4$ ........................... H04N 9/81; H04N 9/89
[52] U.S. Cl. .................................... 358/334; 358/322; 358/324
[58] Field of Search ............... 358/310, 328, 330, 334, 358/342, 322

[56] References Cited

U.S. PATENT DOCUMENTS 4,553,175  11/1985  Baumeister .......................... 358/310

Primary Examiner—Donald McElheny, Jr.
Attorney, Agent, or Firm—Antonelli, Terry & Wands

[57] ABSTRACT

A luminance signal Y and two color difference signals (R-Y), (B-Y) are separated from a color video signal. A color difference time division multiplex (TDM) signal is produced from the two color difference signals by a time base compression and time base multiplexing. A burst signal is added on the luminance signal and the color difference TDM signal as a time base information. The color difference TDM signal is recorded on an inner area of a disc. The luminance signal which has a wide signal band is recorded on an outer area of a disc which has a good frequency response characteristic. By separate recording of the two kinds of signals, a high resolution is obtained.

36 Claims, 8 Drawing Sheets

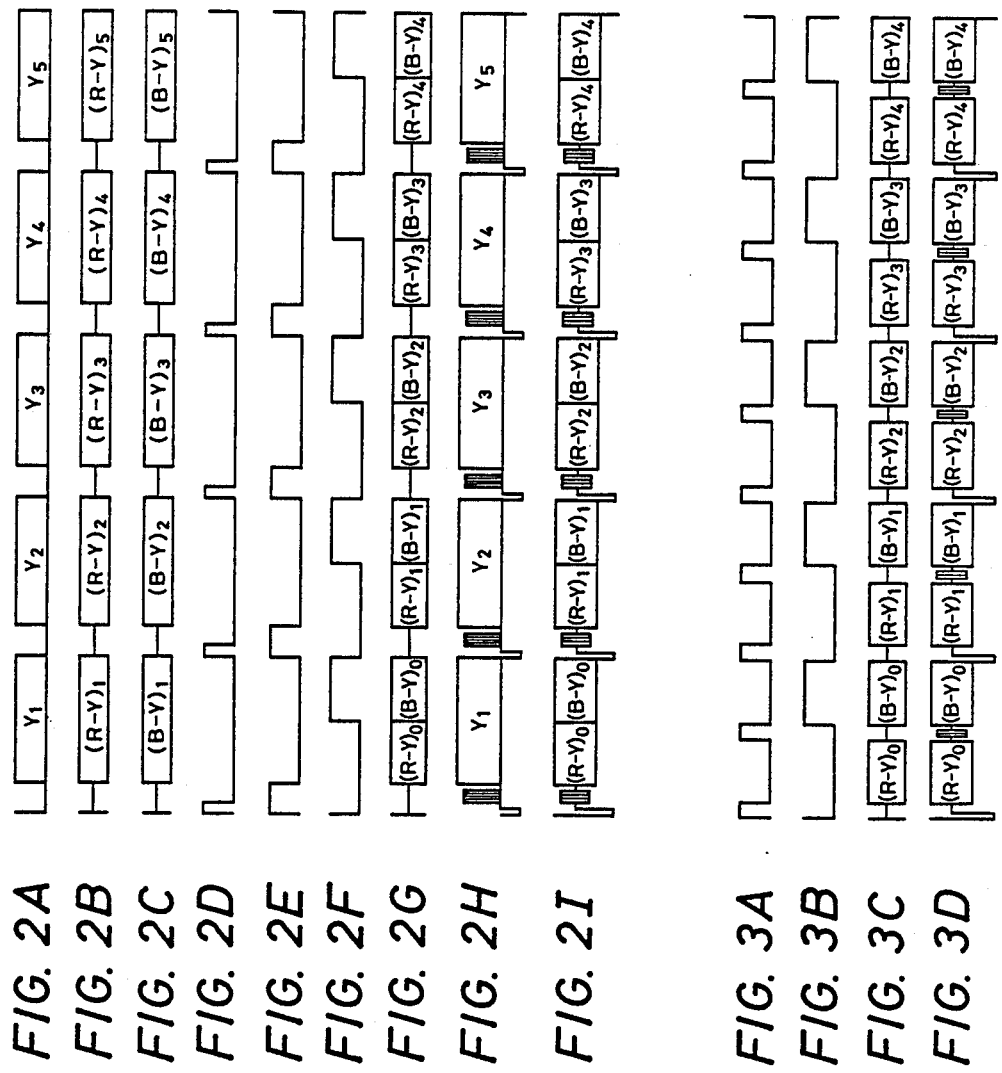

FIG. 11A
FIG. 11B
FIG. 11C
FIG. 11D
FIG. 11E
FIG. 11F
FIG. 11G
FIG. 11H
FIG. 11I
FIG. 11J

VIDEO DISC RECORDING AND/OR REPRODUCING APPARATUS FOR COLOR VIDEO SIGNAL

BACKGROUND OF THE INVENTION

The present invention relates to a video disc apparatus, especially apparatus for recording and/or reproducing a color video signal in a state of a component signal which consists of the color video signal.

A video disc player is known, for example, as described in U.S. Pat. No. 4,371,899. In the video disc player which is used only for a reproduction, a composed color video signal is recorded by frequency modulation with a carrier wave which has a frequency of about 8 to 9 MHz as shown in FIG. 16 of U.S. Pat. No. 4,371,899.

In a video disc player for recording and reproduction, a color signal in the composite color signal is recorded after frequency conversion from 3.58 MHz to 625 kHz, and a luminance signal is recorded after frequency modulation with a carrier wave of about 5 to 6 MHz. The frequency of the carrier wave for the write once type of the video disc player is lower than that for the reproduction type of the video disc player, because of the low resolution of the recording optical head of the recording and reproduction type video disc player.

In the video disc player described above, a resolution in a horizontal direction is about 300 to 350 lines in a field. However, a higher resolution is desired.

SUMMARY OF THE INVENTION

An object of the present invention is to provide an improved video disc recording and/or reproducing apparatus which has a high resolution.

In accordance with the present invention, a luminance signal is recorded on an outer area of the disc surface, and a color difference TDM (Time Division Multiplex) signal is recorded on an inner area of the disc surface. The colour difference TDM signal is obtained by time division multiplexing two color difference signal (R-Y) and (B-Y) formed as a difference between the red color signal and the luminance signal (R-Y) and as a difference between a blue color signal and the luminance signal (B-Y). As the color difference TDM signal, there are two types, one of which is based on the compression in the time base, and the other is a line sequence. These signals are recorded by two optical head as a component signal.

According to a feature of the present invention, a first burst signal is added to the luminance signal as time base information and a second burst signal is added to the color difference TDM signal as the time base information. A frequency of the first burst signal is twice that of the second burst signal. The burst signal is added in two ways, one of which way is that the burst signal is added at the frequency of each colour difference TDM signal and another way is that the burst signal is added in the middle of the color difference TDM signal when the signal is modulated with a time base compression.

According to another feature of the present invention, the luminance signal and the color difference TDM signal which are reproduced from the disc are converted to a digital signal through an A/D converter. Further, the sampling frequency of the A/D converter is twice that of the first burst signal which is added to the luminance signal.

According to other features of the present invention, an An audio signal is multiplexed with the luminance signal or the color difference TDM signal and is recorded. Further, different audio signals are recorded by the modulation of the luminance signal to the color difference TDM signal respectively for stereo audio reproduction.

BRIEF DESCRIPTION OF THE DRAWING

FIGS. 2A–2I illustrate time charts for the embodiment of FIG. 1.

FIGS. 3A–3D illustrate time charts of an alternative embodiment.

FIGS. 11A–11J illustrate time charts for the embodiment of FIG. 10.

DETAILED DESCRIPTION OF THE PREFERRED EMBODIMENTS

Figure 1:
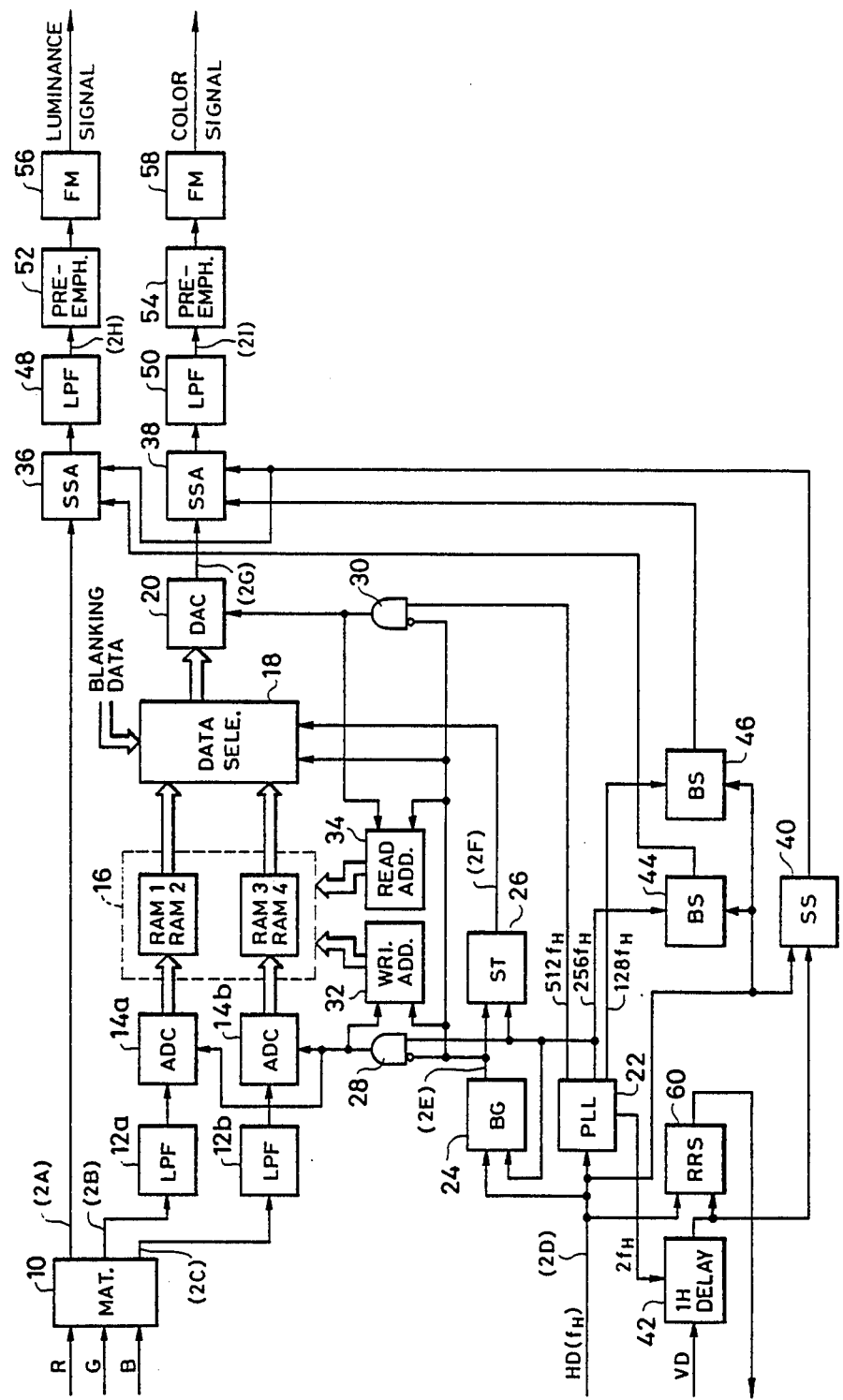
FIG. 1 illustrates a block diagram of a recording signal processing circuit of the present invention.

FIG. 1 shows a block diagram of a recording signal processing circuit for producing a recording signal for a video disc in response to input signals of three color signals R, G, B of a color video signal, of a horizontal drive signal HD and of a vertical drive signal VD. FIGS. 2A–2I show waveforms at various points in the circuitry shown in FIG. 1.

Figure 4:
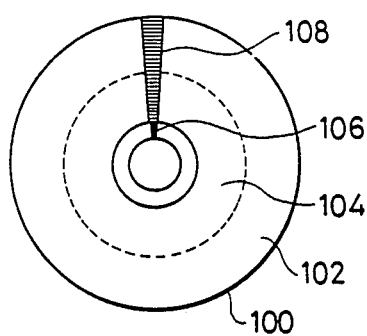
FIG. 4 illustrates a plan view of a disc surface of in accordance with the present invention.

The three color signals R, G, B inputted to a matrix circuit (MAT) 10 are converted into a luminance signal Y and two color difference signals R-Y, B-Y as shown in FIGS. 2A, 2B and 2C. This conversion effectively reduces a bandwidth of a color video signal recorded on the disc 100 as shown in FIG. 4. Assuming that a bandwidth of the luminance signal Y comprises 6 MHz, bandswidth of the two color difference signals (R-Y), (B-Y) of 1.5 MHz, which is a quarter of thet of the luminance signal, are sufficient. The total required bandwidth for the three signals is thus 9 MHz. On the other hand, when three color signals R, G, B are respectively used, the required bandwidth for each of the three color signals R, G, B is 6 MHz, which results in a total bandwidth of 18 MHz and which is double the bandwidth for the former case.

The color difference signals (R-Y), (B-Y) are through low pass filters (LPF) 12a, 12b respectively, and converted to digital signals by analog to digital converters (ADC) 14a, 14b. The A/D converters 14a, 14b, a memory 16, a data selector 18 and a digital to analog converter (DAC) 20 are used for compressing the color difference signals (R-Y), (B-Y) in half in time base, and for producing a color difference time division multiplex signal (color difference TDM signal) as shown in FIG. 2G. A phase locked loop (PLL) circuit 22, a blanking gate signal generator (BG) 24, a switching timing generator (ST) 26, and a read address generator (READ ADD) 34 generate control signals for above described the time base compression and the time division multiplexing described above.

The PLL circuit 22 generates a clock signal synchronized in phase with a horizontal drive signal (HD) shown in FIG. 2D. Letting f(H) is a frequency of the horizontal drive signal (HD), a frequency of the clock signal generated from the PLL circuit 22 is selected to be N.f(H), where N is an integer. The PLL circuit 22 generates four clock signals. The first clock signal has a frequency of 512f(H), the second clock signal has a frequency of 256f(H), the third clock signal has a frequency of 128f(H) and the fourth clock signal has a frequency of 2f(H). The blanking gate signal generator 24 counts a predetermined number of the second clock signals and outputs a gate signal as shown in FIG. 2E which has a high level period corresponding to the blanking period of the input video signal.

In a horizontal effective period except for a blanking period, the second clock signal 256f(H) is supplied to the A/D converters 14a, 14b and the write address signal generator 32 through the logic circuit 28. The A/D converters 14a, 14b digitize the input color difference signals (R-Y), (B-Y) by sampling of the timing of the second clock signal 256f(H). The digitized signals (R-Y), (B-Y) are memorized in the memory 16 synchronized with the second clock signal 256f(H). The memory 16 consists of 4 memory units RAM1, RAM2, RAM3 and RAM4. The memory units RAM1 and RAM2 are used for storing the color difference signal (R-Y), and the memory units RAM3 and RAM4 are used for storing the other color difference signal (B-Y). At every horizontal scanning period, the color difference signal (R-Y) is stored in the memory units RAM1 and RAM2 alternately as the sequence of (RAM1)-(RAM2)-(RAM1)- . . . The signal (B-Y) is stored in the memory units RAM3 and RAM4 alternately as the sequence of (RAM3)-(RAM4)-(RAM3)- . . . A reading out from the memory is done by the reverse sequence.

For reading out operation the first clock signal 512f(H) is supplied to the read address signal generator 34 through the logic circuit 30 in the horizontal effective period, and the digital signal stored in the memory 16 is read out. As the frequency of the first clock signal 512f(H) is twice the frequency of the second clock signal of 256f(H), the digital color difference signal (R-Y), (B-Y) read out from the memory 16 are compressed in half in time base. The read address signal generator 34 generates signals which designate a same address area in the memory 16 twice in the horizontal effective period, and then the digital signals compressed in half in time base (R-Y), (B-Y) are outputted twice repeatedly in the horizontal period. The data selector 18 receives two kinds of timing signals which are shown in FIGS. 2E, 2F. The first signal shown in FIG. 2E is a blanking gate signal generated from the blanking gate generator 24. A low level period of the blanking gate signal represents the horizontal effective period described above, and a high level period of the blanking gate represents a blanking period. The second signal shown in FIG. 2F is a switching timing signal generated from the switching timing signal generator 26, which indicates a timing signal dividing the horizontal effective period into two equal periods. The data selector 18 selects blanking data which corresponds, for example, to "0" level, in the blanking period, thereby selecting the color difference digital signal (R-Y), and then the color difference digital signal (B-Y) in sequence. The D/A converter 20 outputs the analog color difference TDM signal shown in FIG. 2G.

Synchronizing signal adders (SSA) 36, 38 add synchronizing signals and burst signals to the luminance signal (Y) shown in FIG. 2A and the color difference TDM signal (R-Y), (B-Y) shown in FIG. 2G respectively. The synchronizing signals and the burst signals provide a time base information for the luminance signal and the color difference TDM signals, and are used for correcting a time base fluctuation generated by an off-center of a disc, etc. A synchronizing signal generator (SS) 40 generates the synchronizing signal which is a complex synchronizing signal of horizontal synchronizing signals and vertical synchronizing signals. The vertical synchronizing signal is supplied to the synchronizing signal generator 40 through a 1H delay circuit 42 which effects a delay of one horizontal period (1H). The 1H delay circuit 42 counts two clock pulses of the fourth clock signal 2f(H) supplied form the PLL circuit 22 for enabling a delay of 1H period. The 1H delayed vertical synchronizing signal is used for cancelling a 1H delay of the color difference signal due to the time base compression and the time division multiplexing of the color difference signal, and prevents shifting of the color difference signal in a period of equivalent pulses of the complex synchronising pulse. As there is no time delay for the luminance signal, a time difference of a 1H period occurs between the color difference TDM signal (R-Y), (B-Y) and the luminance signal Y. The time difference is corrected in a reproduction process described later. Instead of using the 1H delay circuit 42, the 1H delay of the color difference signal can be corrected in a reproduction process. Instead of using the complex synchronizing signal, only the horizontal synchronizing signal can be used as a synchronizing signal added to the color difference signal and the luminance signal, because the vertical synchronizing period of a color video signal reproduced from the disc can be obtained from a rotational phase of the disc which is produced from a rotational mark signal pre-recorded on the disc.

The burst signal generator (BS) 44 produces a first burst signal by gating the second clock signal 256f(H) after a predetermined timing of, for example, about 4 to 5 $\mu$sec after the horizontal synchronizing signal HD. The first burst signal is added to the luminance signal Y by the synchronizing signal adder 36. The burst signal generator (BS) 46 produces a second burst signal by gating the third clock signal 128f(H) at the same time as the first burst signal. The second burst signal is added to the color difference TDM signal (R-Y)(B-Y) by the synchronizing signal adder 38.

As the horizontal scanning frequency is 15.75 kz, a frequency of the first burst signal is about 4 MHz, and a frequency of the second burst signal is about 2 MHz. A higher frequency of the burst signal is better for detecting a jitter error. However, since a frequency of a carrier wave for frequency modulation of the luminance signal which is recorded on the outer area of the disc is about 8 to 10 MHz as a maximum, the maximum and reasonable frequency of the first burst signal is selected to 4 MHz. On the other hand, since the frequency of a carrier wave for a frequency modulation of the color difference TDM signal which is recorded on the inner area of the disc is about 4 to 6 MHz as a maximum, the reasonable and maximum frequency of the second burst signal is selected to 2 MHz, and is selected to be one half of the frequency of the first burst signal. The ratio between the first and second burst signals is an integer, here two, and the ratio is equal to a ratio of signal bandwidth between the luminance signal and the color difference TDM signal. Therefore, the frequency of the burst signals are set to a higher frequency in each signal band, and the detecting accuracy of the time base information by the burst signals is improved. The integer relationship described above enables the clock signals for producing the burst signals to be immediately obtained from the PLL circuit 22. Further, the frequency of the first and second burst signals is set to be N times the horizontal scan frequency f(H), where N is an integer. Therefore, when repeatedly reproducing the same video signal in one frame, a continuity of the phase of the burst signals can be maintained. Further, the phase of the burst signal in every horizontal scanning cycle is fixed, and it becomes easy to detect the time base information based on the burst signal. Since the frequency of the second burst signal is an even numbered times the horizontal scanning frequency, when a video signal for one field is recorded in one revolution of a disc, that is the video signal for one frame is recorded in two revolution of the disc, and the video signal for only one field is repeatedly reproduced, the continuity of the phase of the burst signal can be maintained.

The luminance signal shown in FIG. 2H and the color difference TDM signal shown in FIG. 2I are supplied to frequency modulators (FM) 56, 58 through low pass filters (LPF) 48, 50 and preemphasis circuits (PRE EMPH) 52, 54. The low pass filters 48, 50 limit a pass band so as not to produce a folded disturbance under the frequency modulation. The preemphasis circuits 52, 54 are utilized for improving the S/N ratio. Recording signals for recording on a disc are obtained as a luminance modulation signal and color modulation signal from the frequency modulators 56, 58.

A rotational reference signal generator (RRS) 60 generates one pulse in one revolution of a disc, i.e., one pulse in one frame or one field as a rotational reference signal of a disc, which is supplied to a motor control circuit not shown in FIG. 1.

FIGS. 3A–3D show waveforms at various points for a modified embodiment. FIG. 3A shows a modified blanking gate signal which has twice the frequency of the gate signal shown in FIG. 2E. FIG. 3B shows a switching timing signal which is the same as the switching timing signal shown in FIG. 2F. The blanking gate signal in FIG. 3A and the switching timing signal in FIG. 3B are applied to the data selector 18, and the data stored in the memory are selected as a pattern shown in FIG. 3C. That is to say, under the condition of a low level of the blanking gate signal and a low level of the switching timing signal, the color difference TDM signal (R-Y) is selected, and under the condition of a low level of the blanking gate signal and a high level of the switching timing signal, the color difference TDM signal (B-Y) is selected. Between the color difference TDM signal (R-Y) and the color difference TDM signal (B-Y), a space is provided. At the synchronizing signal adder 38, the synchronizing signal generated from the generator 40 is added before the color difference TDM signal (R-Y), and the burst signal generated from the generator 46 is added before the color difference TDM signal (B-Y) as shown in FIG. 3D.

FIG. 4 shows a plan view of a disc which is used for the present invention. The disc 100 has an outer area 102 for recording the luminance signal Y, and an inner area 104 for recording the color TDM signal (R-Y)(B-Y). A rotational mark 106 is marked on the most inner area of the disc 100. In an area 108 which is located in a predetermined radial direction, ID signals are preformatted for distinguishing each track of the disc.

The FM signal of the luminance signal is recorded in the luminance signal recording area 102, and the FM signal of the color difference TDM signal is recorded in the color difference signal recording area 104. In the two areas 102, 104, a pair of signal tracks is used for recording a pair of signals of the luminance and the color difference TDM. For example, a track numbered "10001" in the area 102 and a track numbered "1" in the area 104, and a track numbered "10002" in the area 102 and a track numbered "2" in the area 104 are used as the pair of tracks. A track number is identified by the ID signal preformatted in the area 108.

Since the FM luminance signal having a wide signal band is recorded on the outer area which has a good frequency response characteristic in recording and reproducing, the FM color difference signal having a relatively low signal band is recorded in the inner area, a recording and/or reproducing of a color video signal of a wide band can be provided by making the best use of the recording capacity of the disc.

Figure 5:
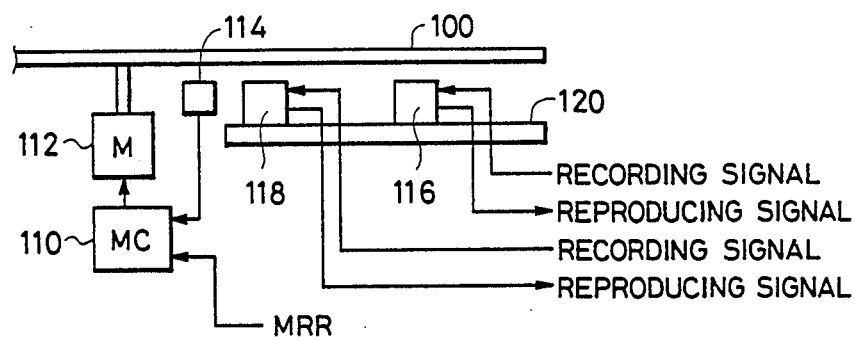
FIG. 5 illustrates a driving section of the present invention.

FIG. 5 is a block diagram of a driving section for driving the disc, and for recording and/or reproducing a signal. A motor control circuit 110 controls a disc motor 112 for rotating the disc 100 so as to synchronize a phase of the motor rotation reference signal supplied from the generator 60 in FIG. 1 and a phase of a rotational mark signal detected by a rotational mark detector 114. Optical heads 116, 118 for recording and/or reproducing signals are moved by a head drive means 120. The first optical head 116 covers the luminance signal recording area 102 located in the outer side of the disc 100. The second optical head 118 covers the color difference signal recording area 104. The two optical heads 116, 118 are arranged on the head drive means 120 at regular intervals. The head drive means 120 drives the first and second optical heads 116, 118 at the same time, the interval between the two optical heads 116, 118 is always kept constant.

Figure 6:
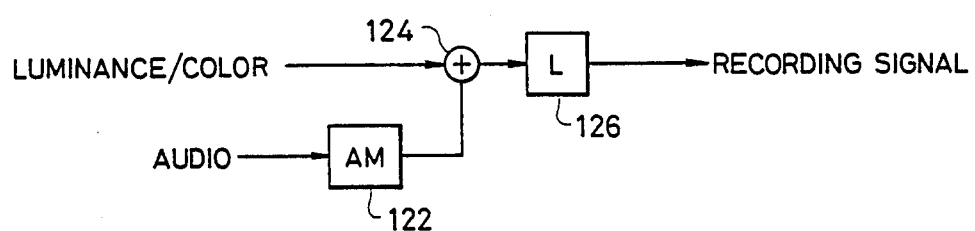
FIG. 6 illustrates a block diagram of an embodiment of the present invention utilizing an audio signal.

FIG. 6 shows a block diagram for producing a recording signal for recording and reproducing an audio signal with a video signal. The audio signal is modulated by an audio modulator 122 to a frequency modulated signal (FM) or a pulse code modulated signal (PCM). The modulated audio signal is frequency-modulated by an adder 124 to the luminance signal or the color difference TDM signal, and outputs the recording signal through a limiter 126. Two kinds of audio signals can be modulated to the luminance signal and the color difference signal respectively for multichannel recording, stereo recording, or bilingual recording. In case of modulating a kind of audio signal to the video signal, the luminance signal is better for the modulation, because the luminance signal recorded in the puter area of the disc has a wide signal band.

Figure 7:
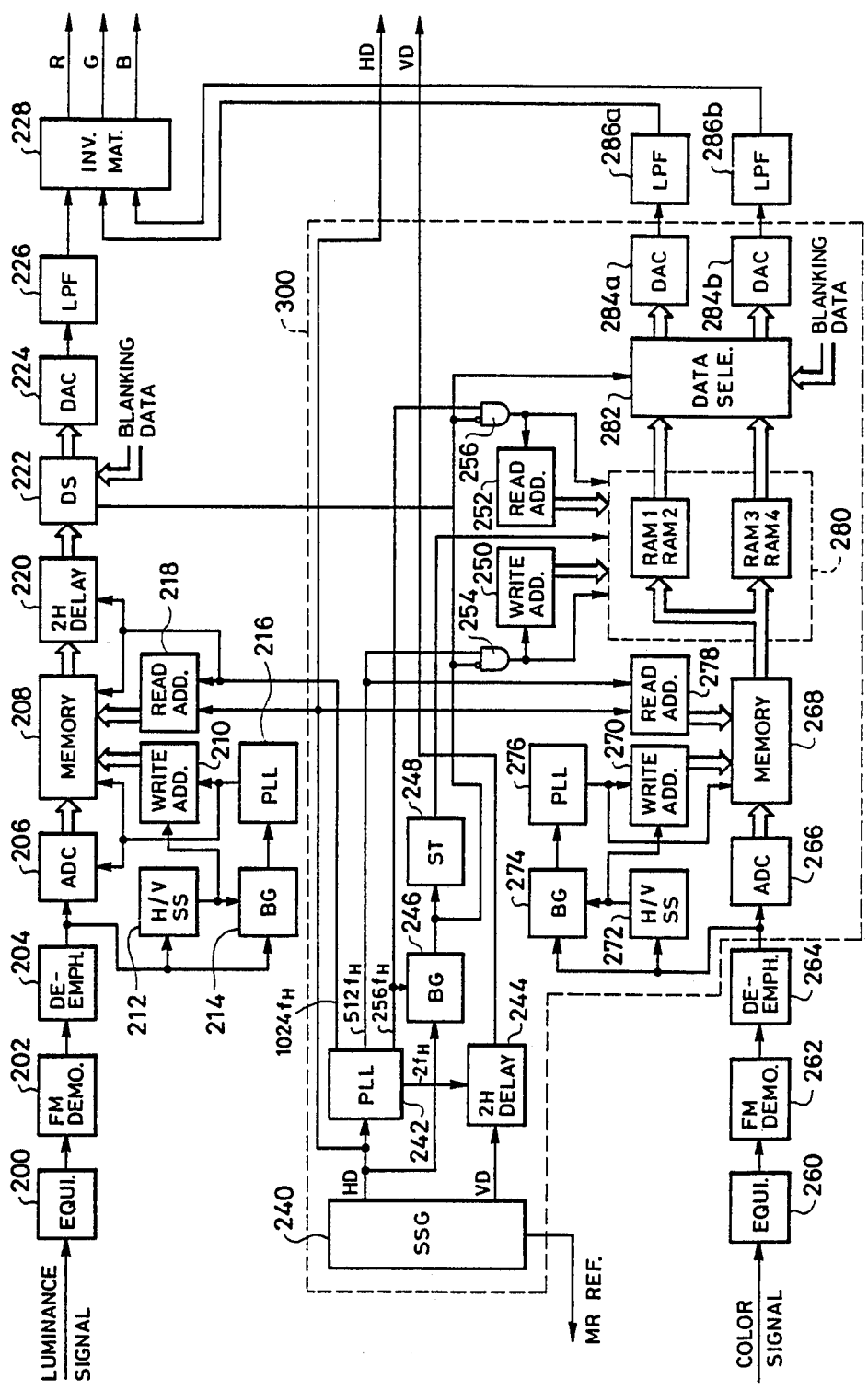
FIG. 7 illustrates a block diagram of a reproducing signal processing circuit of the present invention.

FIG. 7 shows a block diagram of a reproducing signal processing circuit. A reproducing luminance signal (Y) generated from the optical head 116 is inputted to an equivalent circuit (EQUI) 200 in which a frequency characteristic in a high frequency range is improved. The output signal of the equivalent circuit 200 is demodulated by an FM demodulator (FM DEMO) 202. A deemphasis circuit (DE EMPH) 204 demphasizes the signal preemphasized by the preemphasis circuit 52. Since, in the reproducing signal, a time base fluctuation based on a disc off-center is included, a time base correction memory 208 is used. The reproducing signal is converted to a digital signal by an A/D converter 206 and is stored in the memory 208. A writing timing for the memory 208 is controlled by a write address generator (WRITE ADD) 210. From the reproducing signal which include the horizontal synchronizing signal and the burst signal added by the synchronizing signal adder 36, the horizontal synchronizing signal is separated by a horizontal/vertical synchronizing separating circuit (H/V SS) 212, and further the burst signal is gated by a burst gate circuit (BG) 214 based on the horizontal synchronizing signal. A PLL circuit 216 produces a clock signal synchronized with the burst signal. The reproduced luminance signal is sampled at the A/D converter 206 with the clock signal, and stored in the memory 208 at the address designated by the write address generator 210. A synchronizing signal generator (SSG) 240 generates a horizontal drive signal (HD) and a vertical drive signal (VD) which do not have a time base fluctuation. A PLL circuit 242 generates a first clock signal of a frequency of 1024f(H), a second clock signal of a frequency of 512f(H), a third clock signal of a frequency of 256f(H), and a fourth clock signal of a frequency of 2f(H) based on the horizontal drive signal (HD) of a frequency of f(H). A read address generator (READ ADD) 218 generates an address signal based on the HD signal f(H) and the first clock signal 1024f(H), and read out the reproduced signal stored in the memory 208 with a correction of a time base fluctuation.

An equivalent circuit (EQUI) 260, FM demodulator (FM DEMO) 262 and deemphasis circuit (DE EMPH) 264 are used for reproducing the color difference TDM signal, and have the same function as the circuits 200, 202, and 204 described above. An A/D converter (ADC) 266, a time base correction memory 268 a write address generator (WRITE ADD) 270, a horizontal/vertical synchronizing separating circuit (H/V SS) 272, a burst gate circuit (BG) 274, a PLL circuit 276 and a read address generator (READ AD) 278 are used for a time base correction the same manner as the time base correction for the reproduced luminance signal except the following. The read address generator 278 generates an address signal based on the second clock signal 512f(H) which has one half the frequency as used for the read address generator 218. Since the bandwidth of the color difference TDM signal (=3 MHz) is one half of the bandwidth of the luminance signal (=6 MHz), the clock signal (=512f(H)) used in the read address generator 278 is selected to be one half of the clock signal (=1012f(H)) used in the read address generator 218.

Since the output from the memory 268 is a color difference TDM signal, a process for recovering the original color difference signals is effected by a memory 280, a data selector (DATA SELE) 282, D/A converters (DAC) 284a, 284b, low pass filters (LPF) 286a, 286b, a blanking gate generator (BG) 246, a switching timing generator (ST) 248, a write address generator (WRITE ADD) 250, a read address generator (READ ADD) 252, and logic circuits 254, 256. The two recovered color difference signals (R-Y), (B-Y) are supplied to an inverse matrix circuit (INV MAT) 228.

On the other hand, the luminance signal (Y) read out from the memory is supplied to the inverse matrix circuit 228 through a 2H delay circuit 220, a data selector (DS) 222, a D/A converter (DAC) 224 and a low pass filter (LPF) 226. The inverse matrix circuit 228 produces reproduced three color signals R, G, B based on the luminance signal (Y) and the color difference signals (R-Y), (B-Y). Herein, the 2H delay circuit 220 corrects a 2H delay of the color difference signal (R-Y), (B-Y) to the luminance signal by the time base compression and the time base expansion.

In a reproduction process, since a 2H delay is provided by a 1H delay in the memory 268 and a 1H delay in the memory 280, the vertical drive signal (VD) passes through a 2H delay circuit 244 so that the phase of the signal VD is the same as the phase of the three color signals R, G, B.

In spite of the above described embodiment which uses a technique of time base compression, it is possible to obtain a color difference TDM signal by selecting two color difference signals (R-Y), (B-Y) alternately in every horizontal scanning period as (R-Y)1-(B-Y)2-(R-Y)3-(B-Y)4-(R-Y)5- . . . In this case, the resolution in a vertical direction is reduced, but the color difference TDM signal is obtained by a simple construction.

Figure 8:
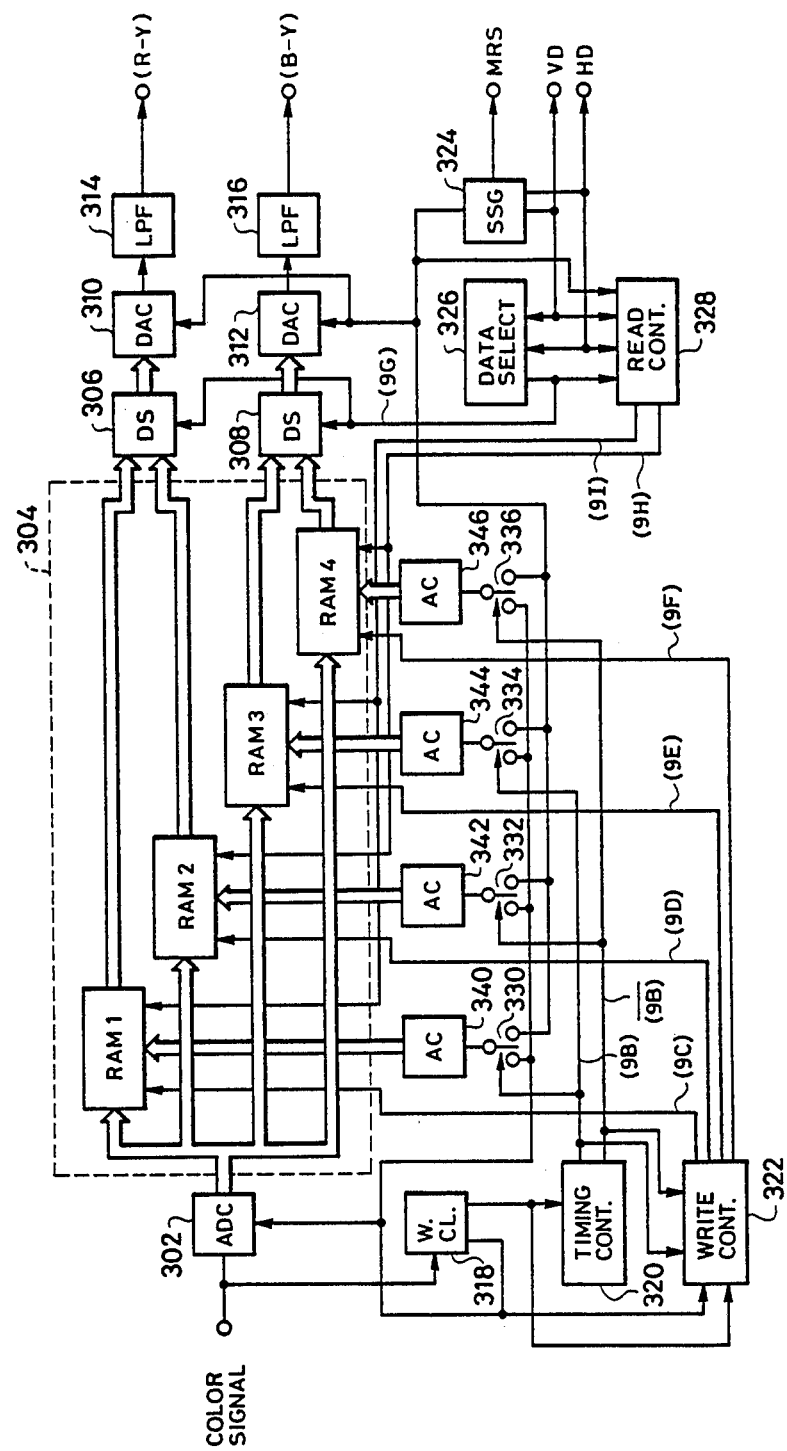
FIG. 8 illustrates a block diagram of another embodiment of a reproducing signal processing circuit of the present invention.

FIG. 8 shows a block diagram of a modified embodiment of the present invention which is a modification of block 300 shown by a dotted line in FIG. 7. In the embodiment shown in FIG. 7, the memory 268 for the time base correction and the memory 280 for the time base expansion are used, but, in the present embodiment shown in FIG. 8, only one memory is used in place of those two memories. FIGS. 9A-9K show waveforms at various points in the circuitry shown in FIG. 8.

In FIG. 8, a signal deemphasized by the deemphasis circuit is input to an A/D converter (ADC) 302, and stored in a memory 304. The memory 304 consists of four memory units RAM1, RAM2, RAM3 and RAM4, in which the former two units RAM1 and RAM2 are used for a time base correction and a time base expansion of the color difference signal (R-Y), and the latter two units RAM3 and RAM4 are used for a time base correction and a time base expansion of the color difference signal (B-Y). The outputs from the memory units are selected by data selectors (DS) 306, 308, converted to analog signals by D/A converters (DAC) 310, 312, and passed through low pass filters (LPF) 314, 316 as recorded color difference signals (R-Y), (B-Y), respectively. A timing control pulse generator (TIMING CONT) 320 generates timing control pulses for switching switches 330, 332, 334 and 336 in a writing or a reading position. A writing control pulse generator (WRITE CONT) 322 generates pulses which designates a writing period of the memory units RAM1, RAM2, RAM3 and RAM4. A synchronizing signal generator (SSG) 324 generates signals of the horizontal drive signal (HD), the vertical drive signal (VD) and the motor rotation synchronizing signal (MRS). A data selecting pulse generator (DATA SELECT) 324 generates a data selecting pulse. A read control pulse generator (READ CONT) 328 generates a pulse which designates reading timing for the memory units. The numerals 340, 342, 344 and 346 indicate address counters (AC).

Figure 9:
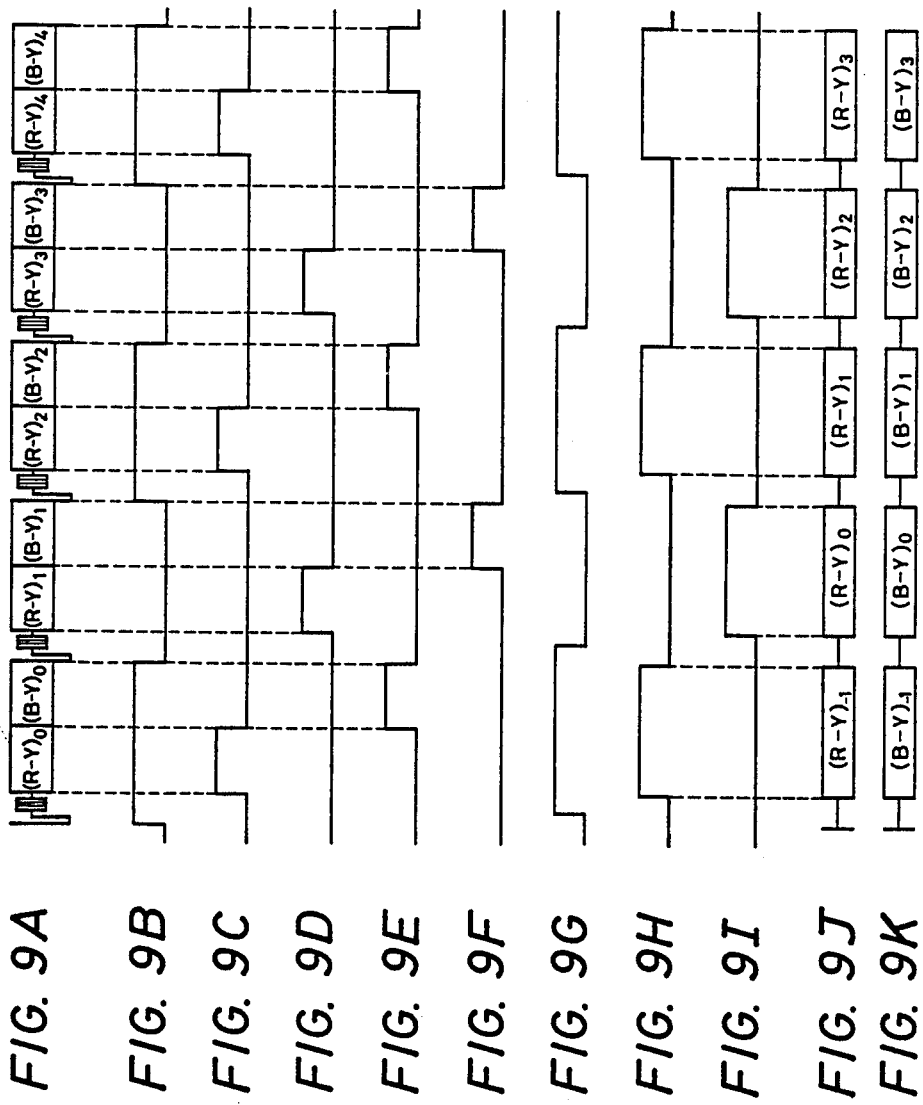
FIGS. 9A–9K illustrate time charts for the reproducing signal processing circuit of the present invention.

A write clock generator (W CL) 318 consists of the horizontal/vertical synchronizing signal generator, the blanking gate generator and the PLL circuit as shown in FIG. 7 with the reference numerals 212 or 274, 214 or 274, and 216 or 276. The output from the PLL circuit included in the generator 318 is applied to the A/D converter 302, the writing control pulse generator 322 and also the switches 330, 332, 334 and 336 which has a frequency of 512.f(H). The synchronizing signal separated by the separating circuit included in the generator 318 is applied to the writing control pulse generator 322 and the timing pulse generator 320. The timing pulse generator 320 generates timing pulses (9B) which repeat "high" levels and "low" levels alternately at each horizontal period (1H) as shown in FIG. 9B and timing pulses (9B-in) inverted "high" and "low" level to the pulse shown in FIG. 9B. The timing pulse (9B) is applied to the switches 330 and 334, and the timing pulse (9B-in) is applied to the switches 332 and 336, which switches a switching position of every switches at every 1H.

The writing control pulse generator 322 supplies the pulses shown in FIG. 9C to the RAM1, the pulses shown in FIG. 9D to the RAM2, the pulses shown in FIG. 9E to the RAM3 and the pulses shown in FIG. 9F to the RAM4. The memory units RAM1, RAM2, RAM3, and RAM4 write in the color difference signals (R-Y) and (B-Y) based on the pulses shown in FIGS. 9C, 9D, 9E and 9F. The synchronizing signal generator 324 generates the horizontal drive signal (HD), the vertical drive signal (VD), and a reading clock signal of a frequency of 1024f(H). The data selecting pulse generator 326 generates the pulse shown in FIG. 9G, and which is supplied to the data selectors 306, 308 and the reading control pulse generator 328. The reading control pulse generator 328 generates the reading control pulse shown in FIGS. 9H and 9I. Namely, the color difference signal (R-Y)0 is stored in the RAM1 by the pulse shown in FIG. 9C, the signal (B-Y)0 is stored in the RAM3 by the pulse shown in FIG. 9E, the signal (R-Y)1 is stored in the RAM2 by the pulse shown in FIG. 9D, and the signal (B-Y)1 is stored in RAM4 by the pulse shown in FIG. 9F. The signals stored in the RAM1 and RAM3 are read out by the pulse shown in FIG. 9I, and then the signals stored in the RAM2 and RAM4 are read out by the pulse shown in FIG. 9H after the time base correction and the time base expansion.

Figure 10:
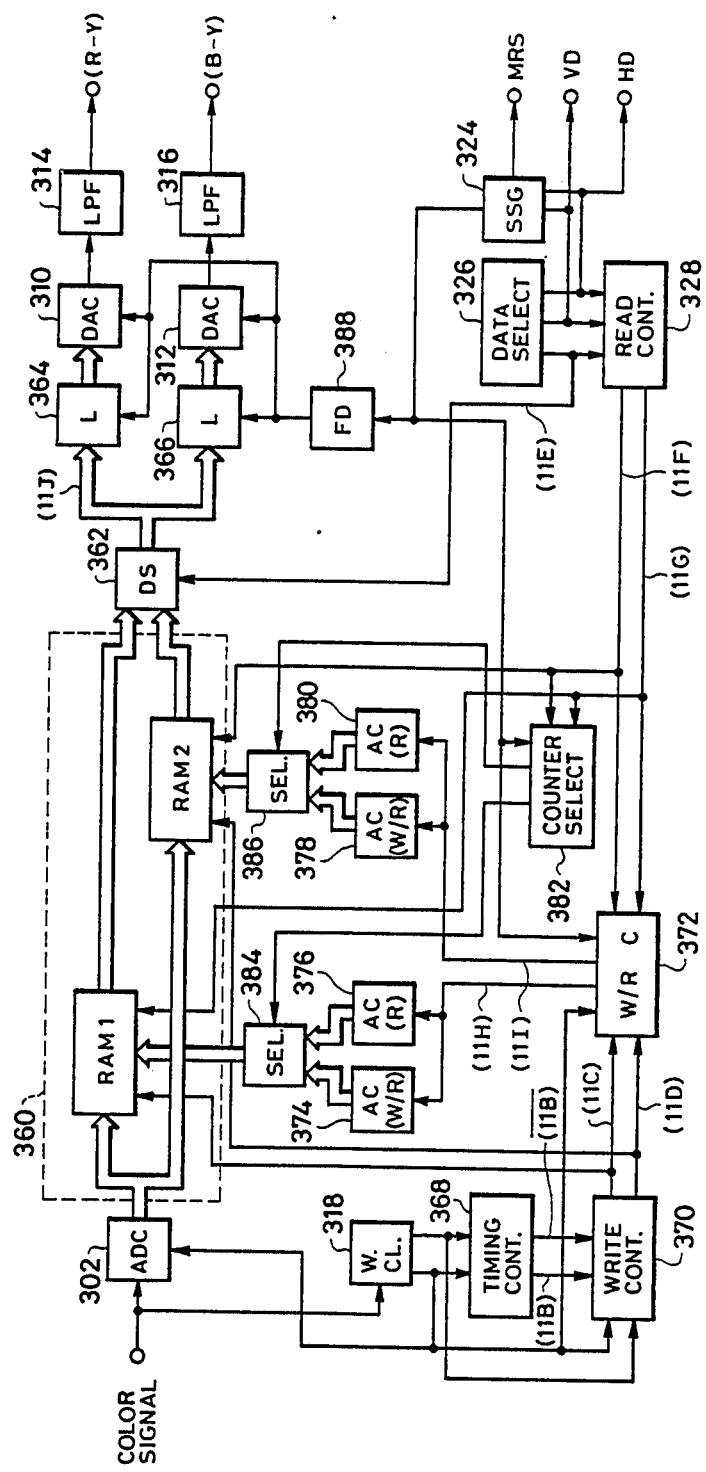
FIG. 10 illustrates a block diagram of still another embodiment of a reproducing signal processing circuit of the present invention.

FIG. 10 shows a block diagram of another embodiment of the present invention which is modified from the embodiment shown in FIG. 8. FIGS. 11A–11J show waveforms at various points in the circuitry shown in FIG. 10.

In FIG. 10, a signal deemphasized by the deemphasis circuit inputs to an A/D converter (ADC) 302, and stored in a memory 360. The memory 360 is consist of two memory units RAM1 and RAM2 which are used for a time base correction and a time base expanding of the color difference signal (R-Y), (B-Y). The outputs from the memory units are selected by a data selector (DS) 362, latched by latch circuits (L) 364, 366 converted to analog signals by D/A converters (DAC) 310, 312, and pass through low pass filters (LPF) 314, 316 as recorded color difference signals (R-Y), (B-Y), respectively. A writing control pulse generator (WRITE CONT) 370 generates pulses which designates a writing period of the memory units RAM1 and RAM2. A synchronizing signal generator (SSG) 324 generates signals of the horizontal drive signal (HD), the vertical drive signal (VD) and the motor rotation synchronizing signal (MRS). A data select pulse generator (DATA SELECT) 326 generates a data selecting pulse. A read control pulse generator (READ CONT) 328 generates a pulse which designate reading timing for the memory units. A writing/reading clock generator (W/R C) 372 produces clock pulse signal for writing or reading of the memory units, which supplies to address counters (AC) 374, 376, 378 and 380. A counter selecting pulse generator (COUNTER SELECT) 382 produces select pulses for controlling counter selectors (SEL) 384, 386. The numeral 388 indicates a frequency divider (FG) of a half dividing.

A write clock generator 318 consists of the horizontal/vertical synchronizing signal generator, the blanking gate generator and the PLL circuit as shown in FIG. 7 with the reference numerals 212 or 272, 214 or 274, and 216 or 276. The output from the PLL circuit included in the generator 318 is applied to the A/D converter 302, the timing control pulse 368 and the writing control pulse generator 370 which has a frequency of 512f(H). The synchronizing signal separated by the separating circuit included in the generator 318 is applied to the writing control pulse generator 370 and the timing pulse generator 368. The timing pulse generator 368 generates timing pulses (11B) which repeat "high" levels and "low" levels alternately at each horizontal period (1H) as shown in FIG. 11B and timing pulses (11B-in) inverted "high" and "low" level to the pulse shown in FIG. 11B. The timing pulse (11B) is applied to the write control pulse generator 370.

The writing control pulse generator 370 supplies a pulse shown in FIG. 11C to the RAM1, a pulse shown in FIG. 11D to the RAM2. The memory units RAM1 and RAM2 write in the color difference signals (R-Y) and (B-Y) based on the pulses shown in FIGS. 11C and 11D. The synchronizing signal generator 324 generates the horizontal drive signal (HD), the vertical drive signal (VD), and a reading clock signal of a frequency of 1024f(H). The data select pulse generator 326 generates the pulse shown in FIG. 11E, and which is supplied to the data selector 362 and the reading control pulse generator 328. The reading control generator 328 generates the reading control pulses shown in FIGS. 11F and 11G.

The writing/reading clock generator 372 generates pulses (11H), (11I) shown in FIGS. 11H, 11I. The pulses (11H) and (11I) are pulses having a 1H period, and have a reading period and a writing period alternately. Therefore, at a first 1H period, the color difference signals (R-Y)0 and (B-Y)0 are stored in the RAM1, and at the next 1H period, the color difference signals (R-Y)0 and (B-Y)0 are read out from the RAM1, and at the same period, the color difference signals (R-Y)1 and (B-Y) are stored in the RAM2 and so on.

At the writing state, only the address counter 374 or the address counter 378 is used. At the reading state, the address counters 364 and 376 or the address counters 378 and 380 are used.

Assuming that sampling numbers of the color difference signal (R-Y) are "M" and sampling numbers of the color difference signal (B-Y) are also "M", the sampling numbers of the color difference signals (R-Y) and (B-Y) are "2M". At the writing state, the address counter 374 designates the address number from "1" to "2M", and the color difference signals (R-Y)0 and (B-Y)0 are stored in the RAM1. At the next reading state, the address counter 374 designates the address number from "1" to "M", and the address counter 376 designates the address number from "M+1" to "2M". Since the selector 384 selects the address number designated by the address counter 374 and the address number designates by the address counter 378 alternately, the signals are read out from the RAM1 as (R-Y)0-1 - (B-Y)0-1 - (R-Y)0-2 - (B-Y)0-2 - (R-Y)0-3 - (B-Y)0-3 - - - - - (R-Y)0-M - (B-Y)0-M. The frequency of the reading clock is selected to 512f(H) for expanding a time base. At the next 1H period, the signals are read out from the RAM1 as (R-Y)1-1 -(B-Y)1-1 - (R-Y)1-2 - (B-Y)1-2 - (R-Y)1-3 - (B-Y)1-3 - - - -- (R-Y)1-M - (B-Y)1-M. The data delector 362 selects the signals from the RAM1 and the RAM2 at every 1H period alternately by the data selecting pulse (11E) shown in FIG. 11E. The output data from the selector 362 is shown as FIG. 11J. The latch circuits 364 and 366 latch the data produce from the selector 362 with a timing pulse divided a half by the frequency dividing circuit 388. The latch circuit 364 pulls out only the color difference signal (R-Y), and the latch circuit 366 pulls out only the color difference signal (B-Y). The color difference signals (R-Y) and (B-Y) are converted to analogue signals by the D/A converters 310, 312 respectively, and pass through the low pass filters 314, 316.

The present invention can be applied not only to an optical type recording and reproducing system but also to an optomagnetic type recording and reproducing system, or a mechanically or optically recording and capacitive type reproducing system.

As described above, according to the present invention, a reproduced picture without jamming between the luminance signal and the color signal can be obtained, because the luminance signal and the color difference signal are recorded in different and separated areas of the disc. As the luminance signal having a wide band is recorded on the outer side of the disc which has a good frequency response, high resolution can be achieved.

Since the burst signals added on the luminance signal and the color difference TDM signal have frequencies which respond to the band width of both signals and which are an integer multiple of the horizontal scanning frequencies, it is easy to detect the fluctuation of the time base accurately and to correct the same.

We claim:

1. An apparatus for recording a color video signal on a disc comprising:
    matrix means for producing a luminance signal by adding tri-color signals in said video signal with a predetermined ratio, and for producing two color difference signals by subtracting said luminance signal from two of said tri-color signals respectively;
    means for producing a color difference time division multiplexed (TDM) signal by multiplexing said two color difference signals received from said matrix means;
    means for adding time base information on said luminance signal produced from said matrix means, and on said color difference TDM signal produced from said producing means respectively; and
    means for recording all said color difference TDM signal having said time base information on an inner area of said disc, and for recording all said luminance signal having said time base information on an outer area of said disc.

2. The apparatus according to claim 1, wherein said time base information comprises at least one burst signal.

3. The apparatus according to claim 2, wherein said time base information comprises a first burst signal and a second burst signal, said first burst signal being added on said luminance signal, said first burst signal having a frequency of 2Nf(H), said second burst signal being added on said color difference TDM signal, said second burst signal having a frequency of Nf(H), where f(H) is a horizontal scanning frequency, and N is an integer.

4. The apparatus according to claim 1, wherein said time base information is a complex synchronizing signal of a horizontal drive signal (HD) and a vertical drive signal (VD).

5. The apparatus according to claim 4, wherein said VD signal is delayed one horizontal scanning period (1H) with respect to said HD signal.

6. The apparatus according to claim 1, wherein said two color difference signals include one color difference signal (R-Y) and another color difference signal (B-Y) where R is a red color signal, B is a blue color signal and Y is the luminance signal, said color difference TDM signal producing means comprising:
    means for storing said two color difference signals (R-Y) and (B-Y) in a memory with a frequency of 2Nf(H);
    means for reading out said stored signals (R-Y) and (B-Y) in said memory with a frequency of 4Nf(H); and
    means for alternately selecting said signals (R-Y) and (B-Y) read out from said memory;
    where f(H) is a horizontal scanning frequency, and N is an integer.

7. The apparatus according to claim 6, wherein said time base information includes two kinds of time base information in the form of a complex synchronizing signal and a burst signal, said two kinds of time base information being added on and before at least one of said two color difference TDM signals continuously.

8. The apparatus according to claim 6, wherein said time base information includes a complex synchronizing signal and a burst signal, said complex synchronizing signal being added on and before one of said two color difference TDM signals, and said burst signal being added on and before the other of said two color difference TDM signals.

9. The apparatus according to claim 6, wherein said means for alternately selecting said signals read out from said memory alternately select said signals (R-Y) and (B-Y) read out from said memory in every horizontal scanning period.

10. The apparatus according to claim 1, wherein said recording means includes two optical heads arranged for simultaneous movement in a radial direction of said disc.

11. The apparatus according to claim 1, further comprising means for frequency multiplying an audio signal onto at least one of said luminance signal and said color difference TDM signal.

12. An apparatus for reproducing a color video signal on a disc comprising:
    means for reproducing a color difference time division multiplexed (TDM) signal recorded on an inner area of said disc and for reproducing a luminance signal recorded on an outer area of said disc;
    means for storing said reproduced luminance signal in a memory synchronized with said time base information added on said luminance signal, and for reading out said stored signal from said memory based on a reference clock signal so as to obtain a luminance signal having a time base fluctuation removed therefrom;

means for storing said reproduced color difference TDM signal in a memory synchronized with said time base information added on said color difference TDM signal, and for reading out said stored signal from said memory based on a reference clock signal so as to obtain a color difference TDM signal having a time base fluctuation removed therefrom;

means for expanding a time base of said color difference TDM signal and for separating two color difference signals; and matrix means for producing tri-color signals by adding said luminance signal and said two color difference signals.

13. The apparatus according to claim 12, wherein said time base information includes at least one burst signal.

14. The apparatus according to claim 13, wherein said time base information includes a first burst signal and a second burst signal, said first burst signal being added on said luminance signal and having a frequency of 2Nf(H), said second burst signal being added on said color difference TDM signal and having a frequency of Nf(H), where f(H) is a horizontal scanning frequency, and N is an integer.

15. The apparatus according to claim 13, wherein said color difference TDM storing means stores said color difference TDM signal in said memory synchronized with said burst signal of a frequency of Nf(H), and includes means for reading out said signals stored in said memory with a frequency of 2Nf(H).

16. The apparatus according to claim 13, wherein said luminance signal storing means stores said luminance signal in said memory synchronized with said burst signal of a frequency of 2Nf(H), and includes means for reading out said signals stored in said memory with a frequency of 4Nf(H).

17. The apparatus according to claim 12, wherein said time base information includes a complex synchronizing signal of a horizontal drive signal (HD) and a vertical drive signal (VD).

18. The apparatus according to claim 12, further comprising means for delaying said luminance signal from said reading out means for two horizontal scanning periods (2H), and for outputting said delayed signal to said matrix means.

19. The apparatus according to claim 12, wherein said expanding and separating means for said color difference TDM signal comprises:

means for storing said two color difference signals in a memory with a frequency of 4Nf(H), one of said color difference signals being (R-Y) and the other of said color difference signals being (B-Y), where R is a red color signal, B is a blue color signal and Y is the luminance signal;

means for reading out said stored signals (R-Y) and (B-Y) in said memory with a frequency of 8Nf(H); and means for alternately selecting said signals (R-Y) and (B-Y) read out from said memory;

where f(H) is a horizontal scanning frequency, and N is an integer.

20. The apparatus according to claim 12, wherein said reproducing means includes two optical heads arranged for simultaneous movement in a radial direction of said disc.

21. An apparatus for recording and reproducing a color video signal on a disc comprising:

matrix means for producing a luminance signal by adding tri-color signals in said color video signal with a predetermined ratio, and producing two color difference signals by subtracting said luminance signal from two of said tri-color signals respectively;

means for producing a color difference time division multiplexed (TDM) signal by multiplexing said two color difference signals received from said matrix means;

means for adding time base information on said luminance signal produced from said matrix means, and on said color difference TDM signal produced from said producing means respectively;

means for recording all said color difference TDM signal having said time base information on an inner area of said disc and for recording all said luminance signal having said time base information on an outer area of said disc;

means for reproducing a color difference time division multiplexed (TDM) signal recorded on an inner area of each disc and for reproducing a luminance signal recorded on an outer area of said disc;

means for storing said reproduced luminance signal in a memory synchronized with said time base information added on said luminance signal, and for reading out said stored signal from said memory based on a reference clock signal so as to obtain a luminance signal having a time base fluctuation removed therefrom;

means for storing said reproduced color difference TDM signal in a memory synchronized with said time base information added on said color difference TDM signal, and for reading out said stored signal from said memory based on a reference clock signal so as to obtain a color difference TDM signal having a time base fluctuation removed therefrom;

means for expanding a time base of said color difference TDM signal, and for separating two color difference signals; and matrix means for producing tri-color signals by adding said luminance signal and said two color difference signals.

22. The apparatus according to claim 21, wherein said time base information comprises at least one burst signal.

23. The apparatus according to claim 22, wherein said time base information comprises a first burst signal and a second burst signal, said first burst signal being added on said luminance signal, said first burst signal having a frequency of 2Nf(H), said second burst signal being added on said color difference TDM signal, said second burst signal having a frequency of Nf(H), where f(H) is a horizontal scanning frequency, and N is an integer.

24. The apparatus according to claim 21, wherein said time base information is a complex synchronizing signal of a horizontal drive signal (HD) and a vertical drive signal (VD).

25. The apparatus according to claim 24, wherein said VD signal is delayed one horizontal scanning period (1H) with respect to said HD signal.

26. The apparatus according to claim 21, wherein said two color difference signals include one color difference signal (R-Y) and another color difference signal (B-Y) where R is a red color signal, B is a blue color signal and Y is the luminance signal, said color difference TDM signal producing means comprising:

means for storing said two color difference signals (R-Y) and (B-Y) in a memory with a frequency of 2Nf(H);

means for reading out said stored signals (R-Y) and (B-Y) in said memory with a frequency of 4Nf(H); and means for alternately selecting said signals (R-Y) and (B-Y) read out from said memory;

where f(H) is a horizontal scanning frequency, and N is an integer.

27. The apparatus according to claim 26, wherein said time base information includes two kinds of time base information in the form of a complex synchronizing signal and a burst signal, said two kinds of time base information being added on and before at least one of said two color difference TDM signals continuously.

28. The apparatus according to claim 26, wherein said time base information includes a complex synchronizing signal and a burst signal, said complex synchronizing signal being added on and before one of said two color difference TDM signals, and said burst signal being added on and before the other of said two color difference TDM signals.

29. The apparatus according to claim 26, wherein said means for alternately selecting said signals read out from said memory alternately select said signals (R-Y) and (B-Y) read out from said memory in every horizontal scanning period.

30. The apparatus according to claim 21, wherein said recording means includes two optical heads arranged for simultaneous movement in a radial direction of said disc.

31. The apparatus according to claim 21, further comprising means for frequency multiplying an audio signal onto at least one of said luminance signal and said color difference TDM signal received from said matrix means, and for producing an output thereof to one of said producing means for said color difference TDM signal and said adding means.

32. The apparatus according to claim 22, wherein said time base error correcting means includes means for storing color difference TDM signal in a memory synchronized with said burst signal of a frequency of Nf(H), and means for reading out said signals stored in said memory with a frequency of 2Nf(H).

33. The apparatus according to claim 22, wherein said time base error correcting means includes means for storing said luminance signal in a memory synchronized with said burst signal of a frequency of 2Nf(H), and means for reading out said signals stored in said memory with a frequency of 4Nf(H).

34. The apparatus according to claim 21, wherein said expanding and separating means for said color difference TDM signal comprises:

means for storing said two color difference signals in a memory with a frequency of 4Nf(H), one of said color difference signals being (R-Y) and the other of said color difference signals being (B-Y), where R is a red color signal, B is a blue color signal and Y is the luminance signal;

means for reading out said stored signals (R-Y) and (B-Y) in said memory with a frequency of 8Nf(H); and means for alternately selecting said signals (R-Y) and (B-Y) read out from said memory;

where f(H) is a horizontal scanning frequency, and N is an integer.

35. The apparatus according to claim 21, wherein said reproducing means includes two optical heads arranged for simultaneous movement in a radial direction of said disc.

36. The apparatus according to claim 21, further comprising means for delaying said luminance signal from said reading out means for two horizontal scanning periods (2H), and for outputting said delayed signal to said matrix means.

* * * * *